(12) United States Patent
Galinski

(10) Patent No.: US 10,464,205 B1
(45) Date of Patent: Nov. 5, 2019

(54) WALL MARKING SYSTEM FOR HANGING OBJECTS

(71) Applicant: Richard W. Galinski, Coon Rapids, MN (US)

(72) Inventor: Richard W. Galinski, Coon Rapids, MN (US)

( * ) Notice: Subject to any disclaimer, the term of this patent is extended or adjusted under 35 U.S.C. 154(b) by 107 days.

(21) Appl. No.: 15/601,775

(22) Filed: May 22, 2017

Related U.S. Application Data

(60) Provisional application No. 62/374,868, filed on Aug. 14, 2016.

(51) Int. Cl.
| | |
|---|---|
| *B25H 7/04* | (2006.01) |
| *A47G 1/20* | (2006.01) |
| *G01C 15/02* | (2006.01) |
| *A47G 1/16* | (2006.01) |
| *B25D 5/00* | (2006.01) |

(52) U.S. Cl.
CPC .............. *B25H 7/04* (2013.01); *A47G 1/205* (2013.01); *A47G 1/16* (2013.01); *B25D 5/00* (2013.01); *G01C 15/02* (2013.01)

(58) Field of Classification Search
CPC ...... A47G 1/205; A47G 1/162; A47G 1/1633; B25H 7/04; B25H 7/005; B25H 7/02; B25H 7/045; G01C 15/02
USPC .......................................................... 33/666
See application file for complete search history.

(56) References Cited

U.S. PATENT DOCUMENTS

| | | | | |
|---|---|---|---|---|
| 7,293,925 B1* | 11/2007 | Sanseviero | ............ | A47G 1/205 33/613 |
| 9,555,540 B1* | 1/2017 | Weitsman | .............. | B25H 7/045 |
| 2002/0083612 A1* | 7/2002 | Prather | .................. | A47G 1/205 33/666 |
| 2004/0098875 A1* | 5/2004 | Gould | .................... | A47G 1/205 33/613 |
| 2004/0216319 A1* | 11/2004 | Muchnik | ................ | A47G 1/205 33/666 |
| 2006/0075650 A1* | 4/2006 | Tatum | .................... | B25H 7/045 33/666 |
| 2007/0283588 A1* | 12/2007 | Gardner | ................. | F16B 15/02 33/666 |
| 2009/0193674 A1* | 8/2009 | Megahed | ............... | A47G 1/205 33/666 |
| 2011/0023313 A1* | 2/2011 | Johnson | ................... | B25H 7/04 33/666 |

* cited by examiner

*Primary Examiner* — Yaritza Guadalupe-McCall

(57) ABSTRACT

A wall marking system for hanging objects for marking exact points on the wall where the mounts for hanging the objects are to be inserted. The wall marking system for hanging objects includes a wall marking tool including a disc-shaped support member having a first side and a second side and also including a wall marker integrally attached to the support member and further including a retainer integrally attached to the support member and engagable to a hanging object.

7 Claims, 3 Drawing Sheets

WALL MARKING SYSTEM FOR HANGING OBJECTS

CROSS-REFERENCE TO RELATED APPLICATIONS

The present application claims priority to the provisional application Ser. No. 62/374,868 filed on Aug. 8, 2016, the disclosure of which is expressly incorporated by reference herein in its entirety.

BACKGROUND OF THE INVENTION

Field of the Invention

The present invention relates to wall markers and more particularly pertains to a new wall marking system for hanging objects for marking exact points on the wall where the mounts for hanging the objects are to be inserted.

Description of the Prior Art

The use of wall markers is known in the prior art. More specifically, wall markers heretofore devised and utilized are known to consist basically of familiar, expected and obvious structural configurations, notwithstanding the myriad of designs encompassed by the crowded prior art which have been developed for the fulfillment of countless objectives and requirements.

The prior art includes a body defining engagement means for releasably engaging the suspension element with the body self-supported on the article; and wall-marking means projecting transversely from the body for marking the wall at the location where a support element would be installed; and the suspension element including a saw-tooth engagement surface, the body being generally elongate, having first and second ends and a medial section therebetween, the first and second ends defining generally a plane and at least a portion of the medial section lying generally outside the plane, the wall-marking means projecting generally from one of said ends. Another prior art includes a supporting element such as a ruler with a wire-suspending element fixed thereto and a wall-marking element such as a tack fixed opposite to the wire-suspending element. Also another prior art includes a measuring tool which allows for a quick, accurate determination of the appropriate position to hang a hook or similar hanger on a wall for supporting a picture or similar object. The tool includes horizontal and vertical legs and a sliding member that moves along the vertical leg. Further, another prior art includes a crossbar and first and second vertical arms oriented perpendicular to the crossbar. The crossbar has a longitudinal track and a leveling bubble. The first and second vertical arms each have a linear track that extends along the length, and a marker on the rearward surface thereof. The vertical arms are retained to the crossbar by knuckles having a guide, for slideably engaging the linear track of the vertical arms and the first vertical arms are retained perpendicular to the crossbar and are longitudinally moveable perpendicular to the linear edge. In addition, another prior art includes a retrieval arm operable for engaging the framing wire of a picture and a wall striking element operable for marking on a wall the place for a nail or other hardware to be secured. The device also includes a flanged assembly operable for receiving the retrieval arm and selectively engaging and disengaging the retrieval arm. The flanged assembly is disposed for promotional information or attachments. While these devices fulfill their respective, particular objectives and requirements, the aforementioned patents do not disclose a new wall marking system for hanging objects.

SUMMARY OF THE INVENTION

The general purpose of the present invention, which will be described subsequently in greater detail, is to provide a new wall marking system for hanging objects which has many of the advantages of the wall markers mentioned heretofore and many novel features that result in a new wall marking system for hanging objects which is not anticipated, rendered obvious, suggested, or even implied by any of the prior art wall markers, either alone or in any combination thereof. The present invention includes a wall marking tool including a disc-shaped support member having a first side and a second side and also including a wall marker integrally attached to the support member and further including a retainer integrally attached to the support member and engagable to a hanging object. None of the prior art includes the combination of the elements of the present invention.

There has thus been outlined, rather broadly, the more important features of the wall marking system for hanging objects in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

It is an object of the present invention to provide a new all marking system for hanging objects which has many of the advantages of the wall markers mentioned heretofore and many novel features that result in a new wall marking system for hanging objects which is not anticipated, rendered obvious, suggested, or even implied by any of the prior art wall markers, either alone or in any combination thereof.

Still another object of the present invention is to provide a new wall marking system for hanging objects for marking exact points on the wall where the mounts for hanging the objects are to be inserted.

Still yet another object of the present invention is to provide a new wall marking system for hanging objects that eliminate using cumbersome tools to mark the points on the walls Even still another object of the present invention is to provide a new wall marking system for hanging objects that eliminates mistakes and also reduces the amount of time to hang objects from designated walls.

For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION OF THE INVENTION

Figure 1:
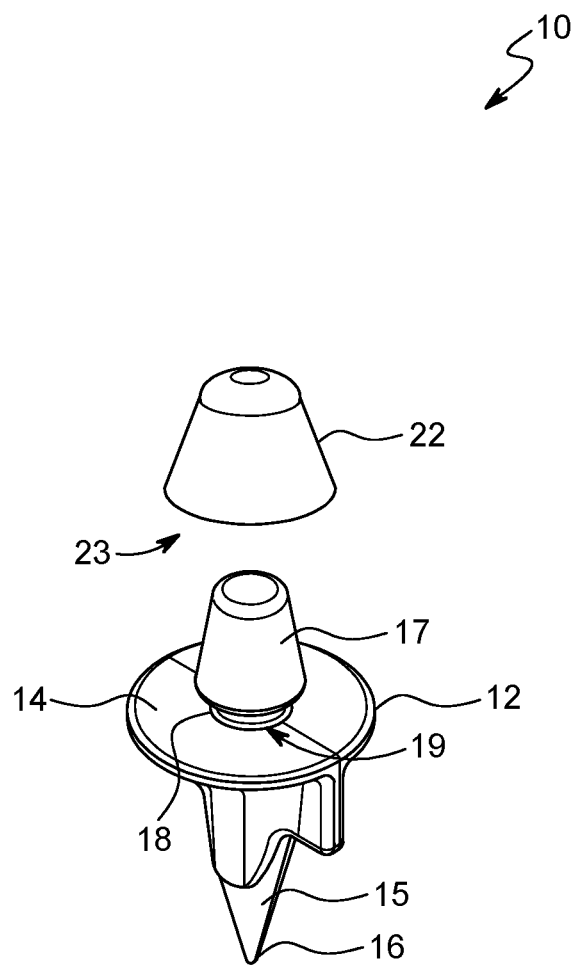
FIG. 1 is a top perspective view of a new wall marking system for hanging objects according to the present invention.
Figure 2:
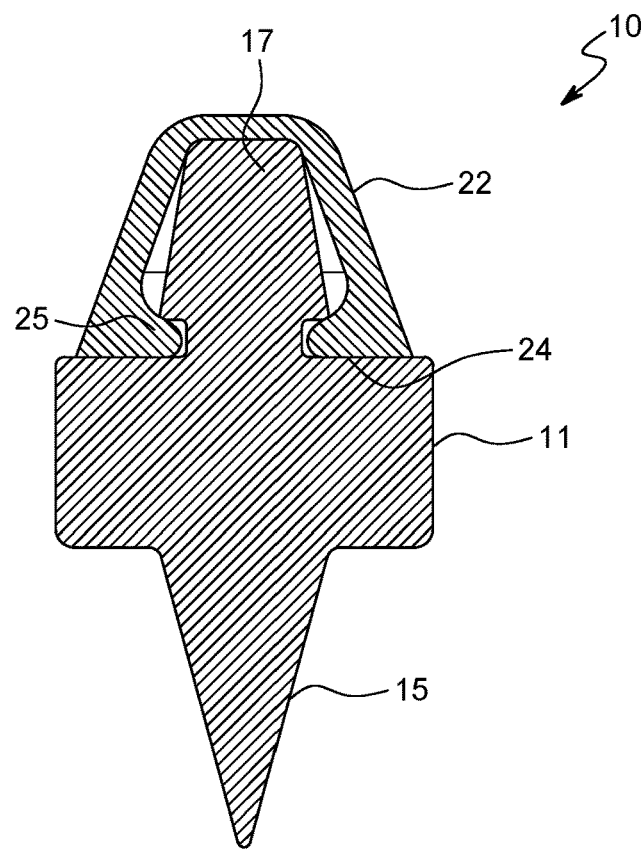
FIG. 2 is a side cross sectional view of the present invention.
Figure 3:
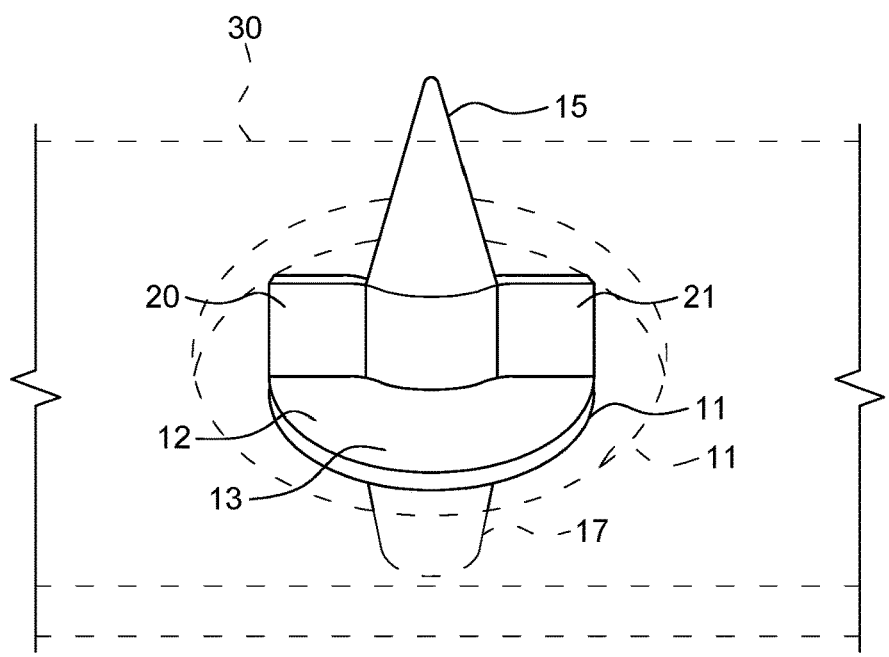
FIG. 3 is a bottom perspective view of the present invention in use with a hanging object.
Figure 4:
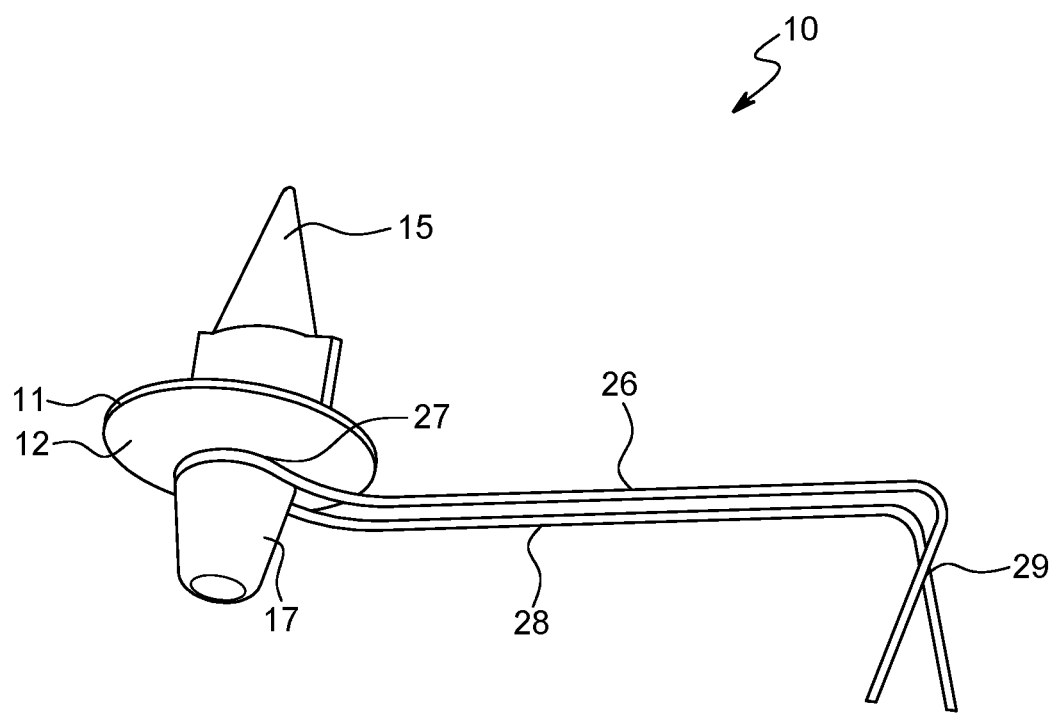
FIG. 4 is a perspective view of the present invention including the alignment member.

With reference now to the drawings, and in particular to FIGS. 1 through 4 thereof, a new wall marking system for hanging objects embodying the principles and concepts of the present invention and generally designated by the reference numeral 10 will be described.

As best illustrated in FIGS. 1 through 4, the wall marking system for hanging objects 10 generally comprises a wall marking tool 11 including a disc-shaped support member 12 having a first side 13 and a second side 14, and also including a wall marker 15 integrally attached to the support member 12 and further including a retainer 17 integrally attached to the support member 12 and engagable to a hanging object 30. The wall marker 15 is centrally attached to the first side 13 of the support member 12 and extends outwardly perpendicular to the first side 13 of the support member 12. The wall marker 15 is tapered inwardly from the first side 13 of the support member 12 and terminates in a pointed outer end 16 such as a spike for imposing a mark on a selected wall. The retainer 17 has a base 18 integrally attached to the second side 14 of the support member 12 with the retainer 17 extending outwardly from the second side 14 of the support member 12. The retainer 17 is conical-shaped and has an annular groove 19 disposed thereabout at the base 18 of the retainer 17 for receiving an edge forming a hole 31 in the hanging object 30. The wall marking tool 11 also includes finger tabs 20, 21 integrally and opposedly attached to the first side 13 of the support member 12 near a perimeter thereof for a user to grasp to engage the wall marking tool 11 to the object 20 intending to be hung from the wall. The finger tabs 20, 21 are diametrically opposed to one another with the wall marker 15 disposed between the finger tabs 20, 21.

The wall marking system for hanging objects 10 also includes a flexible cap 22 selectively and removably disposed upon and about the retainer 17 as needed depending upon a size of the hole 31 in the hanging object 30. The flexible cap 22 is conical-shaped and has an open bottom 23 and a bottom edge 24 with an annular rib 25 integrally disposed along the bottom edge 24 and protruding inwardly of the flexible cap 22. The annular rib 25 is receivable in the annular groove 19 of the retainer 17 to removably retain the flexible cap 22 to the retainer 17.

The wall marking system for hanging objects 10 further includes an elongated rigid alignment member 26 engagable in the annular groove 19 of the retainer 17 to position the wall marker tool 11 when there is no hole in the hanging object 30. The alignment member 26 is a strand of rigid material looped back upon itself and having, a main portion 28, a looped end portion 27 and a finger hold end portion 29 opposite the looped end portion 27. The finger hold end portion 29 is angled relative to the main portion 28 and the looped end portion 27. The looped end portion 27 of the alignment member 26 is receivable in the annular groove 19 of the retainer 17 to control and move the wall marking tool 11 as desired.

In use, a user positions the wall marking tool 11 relative to the hanging object 30 by either engaging the retainer 17 into the hole 31 of the hanging object 30 or using the elongated alignment member 26 and engaging the alignment member 26 to the retainer 17 and moving the wall marking tool 11 relative to the hanging object 30 as desired. The user then positions the hanging object 30 upon the wall with the wall marker 15 facing the wall and presses the hanging object 30 against the wall with the wall marker 15 making an impression into the wall where a fastener is inserted to support the hanging object 30. The user then removes the wall marking tool 11 from the hanging, object 30 when finished.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the wall marking system for hanging objects. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A wall marking system for hanging objects comprising: a solid integrally formed wall marking tool including a flat disc-shaped support member having a first side and a second side, the first side extending below the flat disc shaped support member and consisting of a cone-shaped marker that tapers into a sharp point that has two flat finger tabs that wing out halfway down the cone on opposite sides of the cone that is all solidly connected to one side of the flat disc-shape support member, the second side extending above the flat disc-shape support member and consisting of a smaller cone-shaped member that tapers into a flat end that is about a third of the size of the cone, and has a fixated annular groove retainer that lies between the smaller cone shaped member and the flat disc-shape support member for receiving an end portion of the hanging object.

2. The wall marking system for hanging objects as described in claim 1 also includes a flexible cap selectively and removably disposed upon and about the retainer as needed depending upon a size of the hole in the hanging object.

3. The wall marking system for hanging objects as described in claim 2, wherein the flexible cap is conical-shape and has as open bottom and a bottom edge with an annular rib integrally disposed along the bottom edge and protruding inwardly of the flexible cap, wherein the annular rib is receivable in the annular groove of the retainer to removably retain the flexible cap to the retainer.

4. The wall marking system for hanging objects as described in claim 1 further includes an elongated rigid alignment member engagable in the annular groove of the retainer to position the wall marker tool when there is no hole in the hanging object.

5. The wall marking system for hanging objects as described in claim 4, wherein the alignment member is a stand of rigid material loped back upon itself and having a main portion, a looped end portion and a finger hold end portion opposite the looped end portion, wherein the finger hold end portion is angled relative to the main portion and the looped end portion.

6. The wall marking system for hanging objects as described in claim 5, wherein the looped end portion of the alignment member s receivable in the annular groove of the retainer to control and move the wall marking tool as desired.

7. A method of using the wall marking system for hanging objects comprising: providing a wall marking tool including a wall marker, finger tabs and a retainer; positioning the wall marking tool relative to a hanging object including using an elongated alignment member and engaging the alignment member to the retainer and moving the wall marking tool relative to the hanging object; positioning the hanging object upon a wall with the wall marker facing the wall; and pressing the hanging object against the wall with the wall marker making an impression into the wall where a fastener is inserted to support the hanging object and removing the wall marking tool from the hanging object.

\* \* \* \* \*